(12) United States Patent
Al-Huwaider et al.

(10) Patent No.: US 12,320,683 B2
(45) Date of Patent: *Jun. 3, 2025

(54) PRODUCTION LOGGING SPINNER CLEANING

(71) Applicant: Saudi Arabian Oil Company, Dhahran (SA)

(72) Inventors: Mustafa A. Al-Huwaider, Dhahran (SA); Salem H. Suwadi, Khobar (SA); Shouxiang Mark Ma, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 202 days.

This patent is subject to a terminal disclaimer.

(21) Appl. No.: 18/087,593

(22) Filed: Dec. 22, 2022

(65) Prior Publication Data

US 2024/0209716 A1  Jun. 27, 2024

(51) Int. Cl.
| | |
|---|---|
| *B08B 3/02* | (2006.01) |
| *E21B 36/00* | (2006.01) |
| *E21B 47/10* | (2012.01) |
| *G01F 1/10* | (2006.01) |

(52) U.S. Cl.
CPC .................. *G01F 1/10* (2013.01); *B08B 3/02* (2013.01); *E21B 36/00* (2013.01); *E21B 47/10* (2013.01); *B08B 2203/007* (2013.01)

(58) Field of Classification Search
CPC .......... E21B 36/00; E21B 47/10; E21B 37/00; G01F 1/10; B08B 3/02; B08B 2203/007
See application file for complete search history.

(56) References Cited

U.S. PATENT DOCUMENTS

| | | | |
|---|---|---|---|
| 2,757,739 A | 8/1956 | Douglas et al. | |
| 3,630,078 A | * 12/1971 | Bonnet | E21B 47/10 73/152.35 |
| 3,954,006 A | 5/1976 | Anderson et al. | |
| 4,033,187 A | 7/1977 | Nicolas | |

(Continued)

FOREIGN PATENT DOCUMENTS

CN 210483708 U * 5/2020

OTHER PUBLICATIONS

Mech4study.com [online], "Electromagnetic clutch: Principle, working, advantages and disadvantages with its diagram," Oct. 2017, retrieved on May 10, 2022, retrieved from URL <https://www.mech4study.com/2017/10/electromagnetic-clutch-principle-working-advantages-and-disadvantages-with-diagram.html>, 6 pages.

*Primary Examiner* — Nicole Coy
*Assistant Examiner* — Jennifer A Railey
(74) *Attorney, Agent, or Firm* — Fish & Richardson P.C.

(57) ABSTRACT

A production logging tool includes a housing having a first end configured to connect to a well string disposed in a wellbore, a flowmeter assembly supported by the housing and including a spinner exposed to fluid in the wellbore, and a cleaning assembly connected to the housing and including a fluid nozzle directed at the spinner. The spinner rotates about a central rotational axis of the spinner, and the fluid nozzle direct a flow of cleaning fluid at the spinner. The cleaning assembly can include a fluid pump fluidly connected to the fluid nozzle to drive the flow of cleaning fluid to the fluid nozzle, and a controllable fluid valve between the fluid pump and the fluid nozzle to control the flow of cleaning fluid to the fluid nozzle.

21 Claims, 6 Drawing Sheets

(56) References Cited

U.S. PATENT DOCUMENTS

| | | | |
|---|---|---|---|
| 4,345,480 A | 8/1982 | Basham et al. | |
| 4,581,926 A | 4/1986 | Moore et al. | |
| 4,827,765 A | 5/1989 | Kessler | |
| 6,692,535 B2 | 2/2004 | Olivier | |
| 6,854,342 B2 | 2/2005 | Payne et al. | |
| 7,032,658 B2 | 5/2006 | Chitwood et al. | |
| 7,654,318 B2 | 2/2010 | Cooper et al. | |
| 11,994,005 B1* | 5/2024 | Al Quaimi | E21B 21/08 |
| 2015/0075557 A1* | 3/2015 | Tjhang | E21B 37/00 |
| | | | 134/1 |
| 2016/0215612 A1 | 6/2016 | Morrow | |
| 2018/0328146 A1* | 11/2018 | Kartha | E21B 41/0078 |
| 2021/0131202 A1* | 5/2021 | Kapila | B01D 21/2461 |
| 2022/0243561 A1 | 8/2022 | Al-Huwaider et al. | |
| 2023/0250706 A1* | 8/2023 | Mair | E21B 34/08 |
| | | | 166/373 |
| 2023/0392494 A1 | 12/2023 | Al-Huwaider et al. | |

\* cited by examiner

PRODUCTION LOGGING SPINNER CLEANING

TECHNICAL FIELD

This disclosure relates to wellbore equipment cleaning, and more particularly to cleaning production log spinner flowmeters.

BACKGROUND

Drilling and production operations of a hydrocarbon well include well assessment tools such as production logging tools to quantify production rates of fluids in the hydrocarbon well and determine production profiles in the well. Production logging operations include monitoring a wellbore to evaluate fluid movement in and out of a wellbore, quantify flow rates and flow profiles along a wellbore, determine fluid properties within a wellbore, and determine other fluid and wellbore parameters. Production logging tools often use flowmeters, such as spinner flowmeters.

SUMMARY

This disclosure describes production logging tools including a spinner and a cleaning assembly that cleans the spinner with a jet of cleaning fluid.

In some aspects, a production logging tool includes a housing having a first end to connect to a well string disposed in a wellbore, a flowmeter assembly supported by the housing and including a spinner exposed to fluid in the wellbore, and a cleaning assembly connected to the housing and including a fluid nozzle directed at the spinner. The spinner is rotatable about a central rotational axis of the spinner, and the fluid nozzle directs a flow of cleaning fluid at the spinner.

This, and other aspects, can include one or more of the following features. The flowmeter assembly can further include a spinner shaft coupled to the spinner to rotate with the spinner, and a spinner gauge surrounding at least part of the spinner shaft, the spinner gauge to sense a rotational speed of the spinner. The cleaning assembly can include a fluid pump fluidly connected to the fluid nozzle, the fluid pump to drive the flow of cleaning fluid to the fluid nozzle. The cleaning assembly can further include a controllable fluid valve between the fluid pump and the fluid nozzle, the controllable fluid valve to control the flow of cleaning fluid to the fluid nozzle. The controllable fluid valve can include a solenoid valve. The cleaning assembly can include tubing fluidly connecting the fluid pump and the fluid nozzle. The production logging tool can further include a fluid reservoir within the housing, the fluid reservoir being fluidly connected to the fluid pump, and the fluid reservoir to hold the cleaning fluid and supply the cleaning fluid to the fluid pump. The production logging tool can further include a heating element connected to the fluid reservoir, the heating element to raise a temperature of the cleaning fluid in the fluid reservoir to a minimum threshold temperature. The heating element can include a heating cartridge disposed within the fluid reservoir. The production logging tool can further include a tubing fluidly connected to the fluid nozzle, the tubing to supply the cleaning fluid to the fluid nozzle from a fluid reservoir. The cleaning assembly can include multiple fluid nozzles directed toward the spinner, the multiple fluid nozzles including the first-mentioned fluid nozzle. The fluid nozzle can be positioned laterally offset from the central rotational axis of the spinner. The spinner can include multiple blades, and the fluid nozzle is directed toward at least one blade of the multiple blades. The fluid nozzle can include a one-way valve to permit the flow of cleaning fluid out of the nozzle and restrict a flow of fluid into the nozzle from the wellbore. The production logging tool can further include a controller operatively coupled to the cleaning assembly to control operation of the cleaning assembly.

Certain aspects encompass a method for cleaning a production logging tool. The method includes supplying, with a cleaning assembly of a production logging tool, a flow of cleaning fluid to a fluid nozzle. The production logging tool includes a housing having a first end to connect to a well string disposed in a wellbore, a flowmeter assembly supported by the housing and including a spinner to be exposed to fluid in the wellbore and to rotate about a central rotational axis of the spinner, and the cleaning assembly connected to the housing and including the fluid nozzle. The method further includes directing, with the fluid nozzle, the flow of cleaning fluid to the spinner of the flowmeter assembly.

This, and other aspects, can include one or more of the following features. Supplying the flow of cleaning fluid to the fluid nozzle with the cleaning assembly can include driving the flow of cleaning fluid to the fluid nozzle with a fluid pump fluidly connected to the fluid nozzle. Driving the flow of cleaning fluid to the fluid nozzle with the fluid pump can include controlling the flow of cleaning fluid to the fluid nozzle with a solenoid valve between the fluid pump and the fluid nozzle. The method can further include storing the cleaning fluid in a fluid reservoir of the cleaning assembly, and heating, with a heating element connected to the fluid reservoir, the cleaning fluid in the fluid reservoir to a minimum threshold temperature.

In some aspects, a downhole wellbore tool includes a housing having a first end to connect to a well string disposed in a wellbore, a flowmeter assembly supported by the housing and including a spinner exposed to fluid in the wellbore and rotatable about a central rotational axis of the spinner, a cleaning assembly connected to the housing and including a fluid nozzle directed at the spinner, where the fluid nozzle directs a flow of cleaning fluid at the spinner, and a controller operationally coupled to the cleaning assembly to activate the cleaning assembly to direct the flow of cleaning fluid at the spinner.

This, and other aspects, can include one or more of the following features. The cleaning assembly can further include a fluid pump fluidly connected to the fluid nozzle, the fluid pump to drive the flow of cleaning fluid to the fluid nozzle, a controllable fluid valve between the fluid pump and the fluid nozzle, the controllable fluid valve to control the flow of cleaning fluid to the fluid nozzle, a fluid reservoir within the housing, the fluid reservoir being fluidly connected to the fluid pump, the fluid reservoir to hold the cleaning fluid and supply the cleaning fluid to the fluid pump, and a heating element connected to the fluid reservoir, the heating element to raise a temperature of the cleaning fluid in the fluid reservoir to a minimum threshold temperature. The downhole wellbore tool can further include a receiver communicatively coupled to and configured to receive, from the flowmeter assembly, information comprising at least one parameter of the fluid in the wellbore. The downhole wellbore tool can further include a processor communicatively coupled to the receiver, the processor to receive the information from the receiver, compare the information to a fluid parameter threshold, determine, based on the comparison, that operation of the spinner is impaired, and transmit, based on the determination, instructions to the controller to activate the cleaning assembly.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
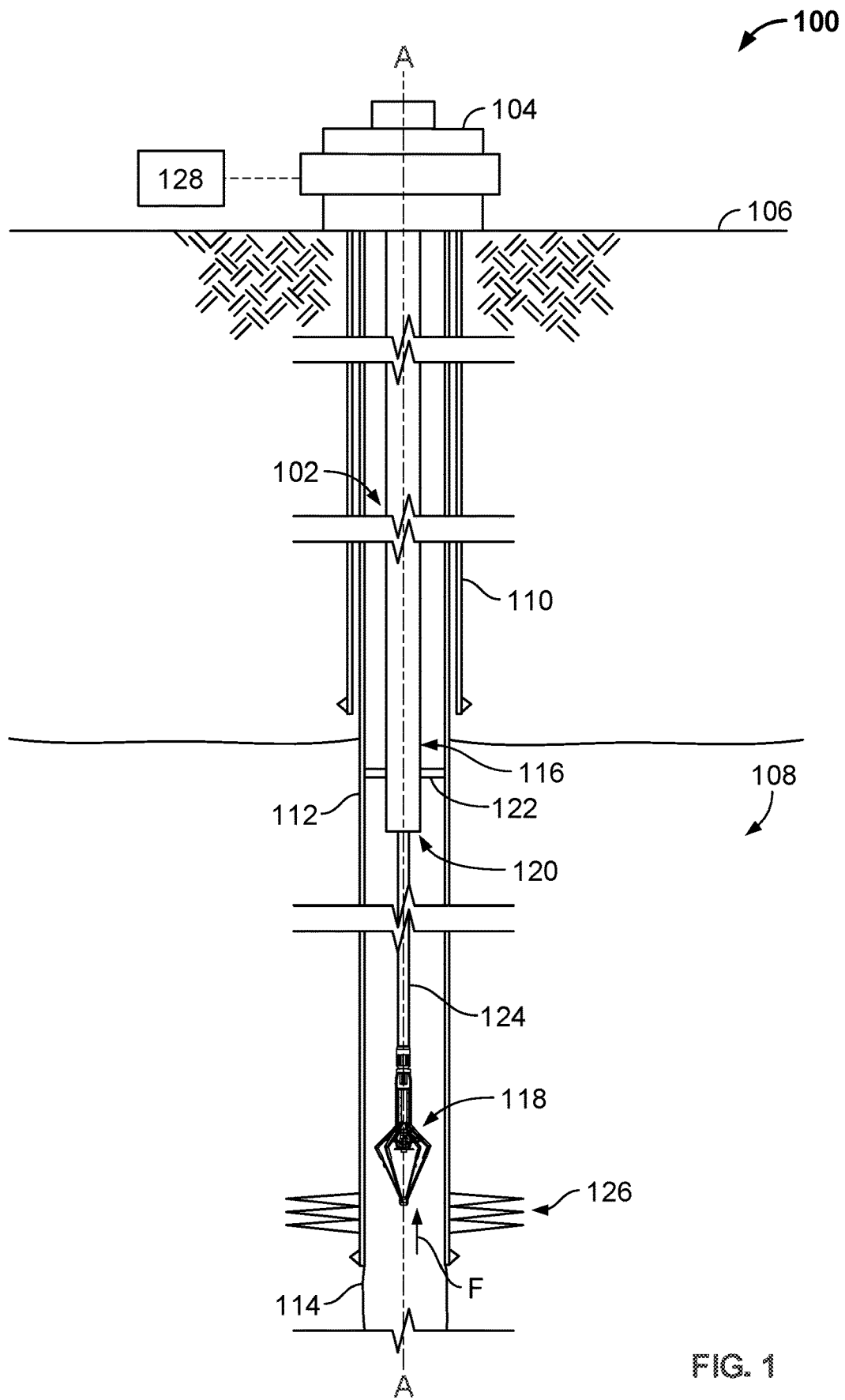
FIG. 1 is a schematic partial cross-sectional side view of an example well system including a production logging tool.

This disclosure describes production logging tools with integrated cleaning assemblies to clean components of the production logging tool while remaining in a downhole wellbore environment. An example production logging tool includes a flowmeter assembly including one or more spinners that quantify production rates of fluid flowing along the production logging tool, thereby causing the spinner(s) to move. In operation, crude oil, tar, wax, or other materials can build up on the spinner, degrading the spinner's ability to freely rotate. This degradation impairs the sensitivity and performance of the spinner and its corresponding sensor components. In some instances, these sticky materials can stall the spinner altogether. The cleaning assembly of the present disclosure includes one or more fluid nozzles directed at the spinner (or spinners) that can direct a jet of cleaning fluid onto the spinner, for example, to remove some or all sticky material that has built up on the spinners (like a dish washer or a car washer). In conventional operations of a production logging tool where a spinner has been impaired by sticky materials or other materials, conventional production logging tools are removed from a wellbore, cleaned outside of the wellbore, then run back in-hole to continue a logging run. In the present disclosure, a production logging tool includes a cleaning assembly with fluid nozzles directed at the one or more spinners to clean the spinners in-situ (for example, while the production logging tool remains in the wellbore).

In some instances, the production logging tool includes a fluid pump, such as an electric pump, to drive the cleaning fluid to the fluid nozzles via high pressure tubing so that the fluid nozzles can jet a cleaning fluid at the spinners with sufficient velocity (and at a sufficient temperature) to remove (partially or entirely) built-up material on the spinners. In certain instances, the production logging tool includes a fluid reservoir to retain a volume of cleaning fluid, a heating element residing in the fluid reservoir to heat the cleaning fluid, and a solenoid to control the flow of cleaning fluid to the fluid nozzle. The heating element can heat the cleaning fluid in the fluid reservoir to a minimum threshold temperature prior to the jetting procedure, for example, for higher cleaning effectiveness in removing sticky materials on and around the spinner. In some examples, the fluid nozzles are connected to the fluid reservoir via high pressure tubes, the fluid pump controls a jetting pressure of the cleaning fluid, and the solenoid controls an opening and closing of the flow of cleaning fluid from the reservoir to the fluid nozzles. The fluid pump, solenoid, heating element, a combination of these, or all of these, can be controlled manually by an operator or automatically via a computer system, such as through a wireline or an active coiled tubing that has communication connection to surface equipment of a wellbore. The cleaning fluid in the reservoir can include surfactants, water, a combination of these, or other fluids.

During an example cleaning operation, cleaning fluid in the reservoir is heated to a pre-determined, minimum threshold temperature, and the solenoid opens after the temperature of the cleaning fluid reaches the minimum threshold temperature. The fluid pump can then drive the cleaning fluid through the high pressure tubing to the fluid nozzle(s), and subsequently onto the spinner(s). In some instances, the direction and orientation of the fluid nozzle(s) targets the spinner at a location that is offset from a central rotational axis of the spinner, so that while jetting, the spinner turns in response to fluid jetting against angled blades of the spinner, in order to have a more complete cleaning of the spinner.

In certain implementations, a production logging tool can be supported on a coiled tubing or other well tubing with fluid pathways within the well tubing. This well tubing can convey cleaning fluid to the production logging tool via the well tubing, such that the fluid reservoir, heating element, fluid pump, or a combination of these, can be eliminated from the production logging tool itself, and instead positioned at a remote location (such as at a surface of the wellbore). For example, heated cleaning fluid can be pumped directly from a surface location and through the well tubing to the fluid nozzles at the production logging tool in order to clean the spinner(s).

FIG. 1 is a schematic partial cross-sectional side view of an example well system 100 that includes a substantially cylindrical wellbore 102 extending from a wellhead 104 at a surface 106 downward into the Earth into one or more subterranean zones of interest. In the example well system 100 of FIG. 1, one subterranean zone of interest 108 is shown. The subterranean zone of interest 108 can include a hydrocarbon reservoir from which hydrocarbons can be extracted. The well system 100 includes a vertical well, with the wellbore 102 extending substantially vertically from the surface 106 to the subterranean zone of interest 108. The concepts described here, however, are applicable to many different configurations of wells, including vertical, horizontal, slanted, split, or otherwise deviated wells.

After some or all of the wellbore 102 is drilled, a portion of the wellbore 102 extending from the wellhead 104 to the subterranean zone 108 can be lined with lengths of tubing, called casing. The wellbore 102 can be drilled in stages, and a casing may be installed between stages. In the example well system 100 of FIG. 1, the wellbore 102 is shown as having been drilled in multiple stages (for example, two stages), and the casings include a first casing 110 and a second casing 112. The first casing 110 can be defined by lengths of tubing lining a first portion of the wellbore 102, and the second casing 112 can be defined by lengths of tubing lining a second portion of the wellbore 102. These portions of the wellbore 102 can be overlapping. For example, the first casing 110 extends from the surface for a first length, and the second casing 112 extends from the surface for a second, longer length that overlaps the first length. The first casing 110 is shown as extending only partially down the wellbore 102; however, the first casing 110 can extend further into the wellbore 102, such as into the subterranean zone 108, or end further uphole in the wellbore 102 than what is shown schematically in FIG. 1. Likewise, the second casing 112 is shown as extending only partially along the wellbore 102 downhole of the first casing 110; however, the second casing 112 can extend further into the wellbore 102 or end further uphole in the wellbore 102 than what is shown schematically in FIG. 1. While FIG. 1 shows the example well system 100 as having two casings (first casing 110 and second casing 112), the well system 100 can include more surface casings or fewer surface casings, or more or fewer casings that begin at a location downhole of the surface 106. For example, the well system 100 can include one, three, four, or more surface casings, and any number of downhole casings. In some examples, the well system 100 excludes casings, and the wellbore 102 is at least partially or entirely open bore. The section(s) of the wellbore 102 exposed to the adjacent formation (for example, without casing or other permanent completion) form an open hole section 114 of the wellbore 102.

The wellhead 104 is installed over the open wellbore 102 on top of the casing, such as the first casing 110 and second casing 112. In some implementations, the well system 100 includes a pipe or tubing installed in the wellbore 102 prior to the installation of the casings 110 and 112, called a conductor, positioned adjacent to the first casing 110. The conductor is set into the surface 106 of the Earth and provides a foundation for the wellbore 102 to be drilled. The conductor is typically the first string of casing installed in the wellbore 102, and is lowered into the wellbore 102 and cemented in place, driven into the surface 106 (such as by a pile driver, or jetted into place such as in offshore wells), or otherwise positioned in the wellbore 102. The example well system 100 of FIG. 1 can include a single conductor or multiple conductors in or around the wellbore 102.

The wellhead 104 defines an attachment point for other equipment of the well system 100 to attach to the well 102. For example, the wellhead 104 can include a Christmas tree structure including valves used to regulate flow into or out of the wellbore 102. In the example well system 100 of FIG. 1, a well string 116 is shown as having been lowered from the wellhead 104 at the surface 106 into the wellbore 102. In the example well system 100 of FIG. 1, the well string 116 is a production tubing that is run into the wellbore 102, and includes a sealing element 122, such as a packer element, at a downhole longitudinal end 120 of the production tubing that seals an annulus of the wellbore between an exterior wall of the well string 116 and an interior wall of the casing 112 (or other wall of the wellbore 102). However, the type of well string 116 can vary. In some instances, the well string 116 includes a series of jointed lengths of tubing coupled end-to-end or a continuous (or, not jointed) coiled tubing. For example, the well string 116 can include a wireline, coiled tubing, drill string, production string, work string, testing string, or other well string with a well tubing used during the lifetime of the well system 100. The well string 116 can include a number of different well tools that can test, produce, intervene, or otherwise engage the wellbore 102. For example, the well string 116 can include one or more isolation packers (such as sealing element 122) to isolate a production zone or reservoir from an annulus uphole of the packer(s). The annulus is the annular space between the well string 116 and an inner wall of the wellbore 102, such as the inner wall of a casing or open bore portion of the wellbore 102. A flow "F" of wellbore fluid (for example, hydrocarbons, water, a mixture of these, or other fluid) flows though the wellbore 102, such as from a reservoir in the subterranean zone into and uphole along the wellbore 102 toward the wellhead 104 at the surface 106. The flow F can flow through the well string 116, through the annulus of the wellbore 102, or both.

In the example well system 100 of FIG. 1, a flexible tubing 124, such as a wireline or coiled tubing, is disposed within the well string 116 and connects to and supports a production logging tool 118 for assessing a fluid, such as the fluid flow F, in the wellbore 102. The flexible tubing 124 extends from the surface 106, such as from a coiled tubing reel (not shown) or other component at the wellhead 104, through the well string 116 and extends further downhole from the well string 116. The flexible tubing 124 can move the production logging tool 118 further downhole or further uphole in the wellbore 102 to control a downhole location of the production logging tool 118. For example, the flexible tubing 124 can control the location of the production logging tool 118 in order to position the production logging tool 118 adjacent to or near perforations 126 in the rock formation of the subterranean zone 108 through which reservoir fluids flow into the wellbore 102. The perforations 126 are shown through the second casing 112 of the example well system 100 of FIG. 1, however, the perforations 126 can be located through a different portion of the wellbore 102, such as through both the second casing 112 and the first casing 110, or another casing, or in the open hole portion 114 of the wellbore 102. The production logging tool 118 is used to quantify production rates of the fluid flow F and determine production profiles along the wellbore 102. For example, the production logging tool 118 can measure fluid flow velocity of fluid in the wellbore 102 across a wellbore interval. The production logging tool 118 includes a flowmeter (such as a spinner or an array of spinners) and one or more sensors (such as temperature sensors, pressure sensors, or other sensors). An example production logging tool is described in more detail later in FIG. 2.

The production logging tool 118 is shown in the example well system 100 of FIG. 1 as supported by the flexible tubing 124 that is disposed at least partially within the well string 116. However, the production logging tool 118 can be supported in the wellbore 102 in other ways. In some implementations, the production logging tool 118 can connect directly (or indirectly) to the well string 116 without the flexible tubing 124. In other implementations, the production logging tool 118 can connect directly (or indirectly) to the flexible tubing 124 without being disposed in a production tubing or other well string 116, such that the well string 116 is excluded from the example system 100.

A production logging operation using the production logging tool 118 can include multiple passes along the wellbore 102, such as multiple downhole and uphole passes, at different speeds for calibration readings of the flowmeter of the production logging tool 118 to fluid velocity at the in situ conditions of fluid viscosity and density. In some implementations, the production logging tool 118 monitors the performance of the hydrocarbon production in the wellbore 102, monitors water injection performance in the wellbore 102, or both.

The production logging tool 118 is shown in FIG. 1 as positioned at a first, downhole longitudinal end 120 of the well string 116. However, the location of the production logging tool 118 on the well string 116 can vary. For example, the production logging tool 118 can be at an intermediate location on the well string 116 between an uphole end and the downhole end 120 of the well string 116. Though the example well system 100 of FIG. 1 shows one production logging tool 118, the number of downhole well tools on the well string 116 can vary. For example, the example well system 100 can include additional well tools uphole of or downhole of the production logging tool 118 along the well string 116. The production logging tool 118 is rugged enough to withstand the harsh environment of the wellbore 102 and to be included on an active well string 116 disposed in the wellbore 102.

The production logging tool 118 is positioned in the wellbore 102 adjacent to the open hole portion 114 of the wellbore 102. However, the production logging tool 118 can instead be positioned adjacent to a cased portion of the wellbore 102, such as within the second casing 112, first casing 110, or both. In certain implementations, the production logging tool 118 is positioned within a production tubing disposed within the wellbore 102, where the production logging tool 118 assesses a flow of production fluid within the production tubing.

The example well system 100 of FIG. 1 also includes surface equipment 128, such as a computer system and controller, that is communicably coupled to the production logging tool 118 to control operation of the production logging tool 118. For example, the surface equipment 128 can include or be connected to one or more computers that transmit and receive information to and from the production logging tool 118 to assess and communicate instructions to operate and clean the production logging tool 118. In other instances, the production logging tool 118 is standalone, in that it includes a controller integrated into the tool 118 to control operation of the production logging tool 118. The surface equipment 128 can include a power source to provide electrical power to the tool 118, and a controller of the surface equipment 128 can control the power supply to the tool 118. A power cable (not shown) can connect the surface equipment 128 to the example production logging tool 118. In some implementations, the production logging tool 118 includes a local power source, such as a battery, housed within or otherwise integrated with the tool 118.

Figure 2:
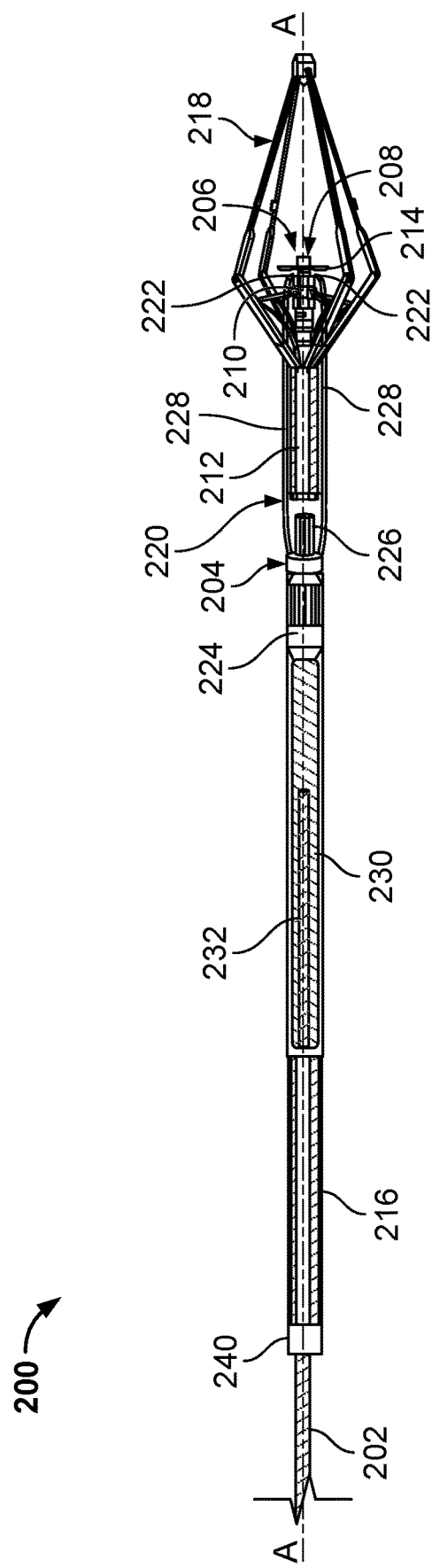
FIG. 2 is a schematic, partial cross-sectional front view, of an example production logging tool.

FIG. 2 is a schematic, partial cross-sectional front view of an example production logging tool 200, which can be disposed in a wellbore and attached to a well string or flexible tubing disposed in the wellbore. The example production logging tool 200 of FIG. 2 can be used in the example well system 100 of FIG. 1, such as in the production logging tool 118 disposed in the wellbore 102 (or within a production tubing) of FIG. 1. The example production logging tool 200 is shown as being carried on a wireline 202, though the production logging tool 200 can be carried on a different type of flexible tubing or well string.

The production logging tool 200 includes a housing 204 with a first end, such as an uphole longitudinal end, that connects to the wireline 202 (or other well string). The housing 204 houses some or all of the components of the production logging tool 200, for example, to protect components from the harsh downhole environment of a wellbore. The housing 204 can be mostly cylindrical in shape, for example, to imitate a cylindrical profile of the wellbore that the production logging tool 200 can reside in. The example production logging tool 200 includes a flowmeter assembly 206 that is supported by the housing 204. The flowmeter assembly 206 includes a spinner 208 that is at least partially exposed to an exterior of the production logging tool 200, for example, so that the spinner 208 is disposed in the fluid residing in a wellbore. The spinner 208 rotates about a central rotational axis. In the example production logging tool 200 of FIG. 2, the central rotational axis is in line with central longitudinal axis A-A; however, the spinner 208 can be positioned away from the axis A-A, such as laterally offset from the axis A-A. The spinner 208 resides in a flow path of wellbore fluid to determine a fluid velocity of the wellbore fluid. In some examples, the spinner 208 attaches to a spinner shaft 210 that resides in a spinner gauge 212. The spinner shaft 210 is coupled to the spinner 208 to rotate with the spinner 208, and the spinner gauge 212 surrounds at least part of the spinner shaft 210 to sense a rotational speed of the spinner 208. The spinner gauge 212 detects the rotation of the spinner shaft 210, which is driven by the spinner 208. The spinner 208 can include spinner blades 214 extending laterally outward from a body of the spinner 208. The spinner blades 214 can be angled to transmit longitudinal flow of wellbore fluid into rotational movement of the spinner 208 about the central rotational axis.

In some implementations, the flowmeter assembly 206 includes additional sensor components for sensing temperature, pressure, density, gamma, or other fluid parameters of the wellbore fluid. For example, flowmeter assembly 206 includes a sensor block 216, which can include one or more of a temperature sensor, pressure sensor, gamma ray sensor, position sensor (such as casing collar locator for depth correlation), density sensor, resistivity sensor, capacitance sensor, a combination of these, or other sensors that can measure certain parameters of the fluid in a surrounding environment, like the wellbore.

In some examples, the production logging tool 200 includes a centralizer 218 attached to a second longitudinal end (for example, the downhole longitudinal end) of the housing 204. The centralizer 218 cages the spinner 208, for example, to protect the spinner 208 and center the spinner 208 at a center of the wellbore. The example production logging tool 200 can exclude the centralizer 218, include a different type of centralizer, or include more than one centralizer disposed along the housing 204.

The example production logging tool 200 includes a cleaning assembly 220, which can be connected to the housing 204. The cleaning assembly 220 includes a fluid nozzle 222 (two shown) positioned near the spinner 208 with a nozzle outlet that is directed at the spinner 208, such as at the spinner blades 214. The fluid nozzle 222 directs a flow of cleaning fluid at the spinner 208, for example, to clean materials (such as oil residue and other sticky material) off of the spinner 208. In some instances, the fluid nozzle 222 is positioned laterally offset from the central rotational axis of the spinner 208 and directed at one of the laterally extending blades 214 of the spinner 208. In operation, the offset orientation of the fluid nozzle 222 targets the blades 214 of the spinner 208 at a location that is offset from the central rotational axis of the spinner, so that while a jet of cleaning fluid is directed out of the fluid nozzle 222, the spinner 208 rotates about its central rotational axis in response to fluid jetting against the angled blades 214 of the spinner 208. The offset orientation can provide a more complete cleaning of the spinner 208.

In some implementations, the fluid nozzle 222 includes a one-way valve (not shown) that permits the flow of cleaning fluid out of the nozzle 222, and restricts a backflow of fluid into the nozzle 222, for example, from the exterior wellbore environment. The one-way valve can include a passive one-way check valve, and prevents or reduces fluid or other materials from entering the fluid nozzle 222 and impacting a performance of the fluid nozzle 222.

The example production logging tool 200 includes two fluid nozzles 222 directed at the single spinner 208; however, the number of fluid nozzles 222, spinners 208, or both, can vary. For example, the production logging tool 200 can include multiple spinners 208 positioned in parallel, in series, or around the production logging tool, for example, forming an array of spinners, and each spinner 208 can include one or more fluid nozzles 222 directed at the respective spinner.

The cleaning assembly 220 includes a fluid pump 224 that is fluidly connected to the fluid nozzle 222. The fluid pump 224 drive the flow of cleaning fluid to the fluid nozzle 222. In the example production logging tool 200 of FIG. 2, the fluid pump 224 resides within the housing 204 of the production logging tool 200, and the housing 204 shields the fluid pump 224 from an exterior environment of the production logging tool 200. In some examples, the fluid pump 224 can be exposed to the exterior environment, or positioned remotely from the production logging tool 200. In some examples, the fluid pump 224 includes an electric pump to drive the cleaning fluid to the fluid nozzle 222.

The cleaning assembly 220 of the example production logging tool 200 of FIG. 2 also includes a controllable fluid valve 226 between the fluid pump 224 and the fluid nozzle 222, high pressure tubing 228 between the fluid pump 224 and the fluid nozzle 222, and a fluid reservoir 230 in the housing 204. The controllable fluid valve 226, high pressure tubing 228, and fluid reservoir 230 are housed within the housing 204. The controllable fluid valve 226 controls the flow of cleaning fluid to the fluid nozzle 222, for example, by opening or closing the fluid pathway to the fluid nozzle 222. The controllable fluid valve 226 is shown in the example production logging tool 200 of FIG. 2 as a solenoid valve, though the fluid valve 226 can take other forms. The controllable fluid valve 226 can be integral with, or separate from, the fluid pump 224. The fluid reservoir 230 is formed in the housing 204, and is fluidly connected to the fluid pump 224. The fluid reservoir 230 holds a volume of the cleaning fluid, and supplies the cleaning fluid to the fluid pump 224. In some implementations, the example production logging tool 200 includes a heating element 232 connected to the fluid reservoir 230, for example, to raise a temperature of the cleaning fluid in the fluid reservoir 230 to a minimum threshold temperature. The minimum threshold temperature can vary. For example, the minimum threshold temperature can be 10% lower than the water boiling point at pressure to prevent water boiling. The heating element 232 can take a variety of forms, and can heat the cleaning fluid in the fluid reservoir 230 in a variety of ways. For example, the heating element 232 can include a heating cartridge that resides within the fluid reservoir 230 in direct contact with the cleaning fluid to heat the cleaning fluid.

The cleaning assembly 220 operates to provide a jet of heated cleaning fluid to the spinner 208 in order to clean the spinner 208 from unwanted materials residing on the spinner 208. The heating element 232 heats the cleaning fluid in the fluid reservoir 230 to a minimum threshold temperature, the controllable fluid valve 226 opens the high pressure tubing 228 to fluid flow from the fluid reservoir 230, and the fluid pump 224 pumps a pressurized flow of the cleaning fluid to the fluid nozzle 222. The fluid nozzle 222 directs a jet of the cleaning fluid onto the spinner 208, for example, to remove unwanted build-up of material on the spinner 208. The temperature of the cleaning fluid is sufficiently warm to promote removal of the sticky materials from the spinner 208.

The cleaning assembly 220 supplies a flow of cleaning fluid to the fluid nozzle 222, and the fluid nozzle 222 directs the flow of cleaning fluid to the spinner 208 of the flowmeter assembly 206. The fluid reservoir 230 stores a volume of the cleaning fluid within the fluid reservoir 230, and the heating element 232 heats the fluid in the fluid reservoir 230 to the minimum threshold temperature. Upon activation by an operator or a controller, the controllable fluid valve 226 opens the high pressure tubing 228 to fluid flow of heated cleaning fluid from the fluid reservoir 230, and the fluid pump 224 drives the heated cleaning fluid to the fluid nozzle 222. The fluid nozzle 222 directs the driven cleaning fluid as a fluid jet at the spinner 208 to remove some or all sticky materials that have built up on the spinner 208, such as during a logging operation of the production logging tool 200.

In some implementations, the example production logging tool 200 includes a controller 240 operatively coupled (for example, electrically and communicatively coupled) to the cleaning assembly 220 to control operation of the cleaning assembly 220. The controller 240 can activate (or deactivate) the cleaning assembly 220 to direct (or stop) the flow of cleaning fluid at the spinner 208. The controller 240 resides within the example production logging tool 200, and is connected to the heating element 232, fluid pump 224, controllable fluid valve 226, or a combination of these, via direct wired connection or wireless connection. The controller 240 acts to initiate a cleaning operation of the cleaning assembly 220, for example, in response to determining that an operation of the spinner 208 is impaired. For example, the controller 240 can determine that, during a logging operation of the production logging tool 200, the spinner 208 has stopped spinning while fluid in the wellbore is flowing, or can determine that flow velocity readings from the spinner 208 do not repeat or provides intermittent readings while passing by the same wellbore interval with the same speed. This determination signifies that the operation of the spinner 208 may be influenced by sticky material build-up on the spinner 208, and the controller 240 can initiate a cleaning sequence of the cleaning assembly 220.

In some implementations, the controller 240 can reside at a surface of the wellbore (e.g., at the wellhead, near the wellhead, or at a different location at the terranean surface of the wellbore), or be positioned downhole and integral with the production logging tool 200. The controller 240 can include one or more processors and one or more receivers. The controller 240 can also be communicably coupled to the flowmeter assembly 206, such as the sensor components of the sensor block 216 of the example production logging tool 200 or other sensors in the wellbore that are integrated with or separate from the production logging tool 200. The controller 240, such as the processor of the controller 240, can use data from the sensors of the sensor block 216, from the flowmeter assembly 206, or both, to determine if there is an obstruction preventing the spinner 208 from rotating as intended. In some implementations, the information from the flowmeter assembly 206 and sensor block 216 can be displayed to an operator for the operator to decide if a cleaning operation should be performed. The receiver of the controller 240 is communicatively coupled to and configured to receive, from the flowmeter assembly 206, information including at least one parameter of the fluid in the wellbore. The processor is communicatively coupled to the receiver, and can receive the information from the receiver, compare the information to a fluid parameter threshold, and determine, based on the comparison, that the operation of the spinner 208 is impaired. The processor can also transmit instructions to the controller 240 to activate the cleaning assembly 220, for example, based on the determination.

In some implementations, the controller 240 can be implemented as a distributed computer system disposed partly at a well surface and partly within the wellbore (such as at the production logging tool 200). The computer system can include one or more processors and a computer-readable medium storing instructions executable by the one or more processors to perform the operations described here. In some implementations, the controller 240 can be implemented as processing circuitry, firmware, software, or combinations of them. The controller 240 can transmit signals to the cleaning assembly 220, flowmeter assembly 206, or both, in real-time or near real-time to clean the spinner 208. As used herein, the term "real-time" refers to transmitting or processing data without intentional delay given the processing limitations of a system, the time required to accurately obtain data, and the rate of change of the data. Although there may be some actual delays, the delays are generally imperceptible to a user.

The flowmeter assembly 206 can transmit information collected by the sensor block 216, spinner gauge 212, or both, to the controller 240. The information includes at least one fluid parameter of the fluid that flows past the example production logging tool 200. For example, the flowmeter assembly 206 can transmit a signal to the receiver of the controller 240 that represents a rotational speed of the spinner 208, and can transmit other information to the receiver, such as pressure data, temperature data, fluid characterization, fluid velocity, fluid flow rate, fluid hold-up (such as fluid volumetric fractions across the wellbore from measurements of density, resistivity, and capacitance), information from a gamma ray and casing collar locator for depth correlation of measurements from the flowmeter assembly 206 with original open hole logs, or other information representative of the wellbore fluid or operation of the flowmeter assembly 206.

The processor of the controller 240 can include the receiver or be separate from the receiver. The processor receives the information gathered by the sensors of the flowmeter assembly 206 and can determine or help an operator to determine if the spinner 208 should be cleaned. For example, the processor of the controller 240 can compare the information to a fluid parameter threshold, determine whether at least one of a sensitivity or performance of the spinner 208 is impaired or compromised, and transmit instructions to the controller 240 or to an operator to activate the cleaning assembly 220 to perform a cleaning operation on the spinner 208. The controller 240 can determine if the flowmeter assembly 206 is impaired using the readings of the spinner gauge 212 and other information, such as the information from the sensor block 216. In some implementations, the controller 240 can determine if there is sticky material build-up on the spinner 208 based on a change of rotational speed of the spinner 208 (such as sudden changes in speed, or a significant reduction in rotational speed). For example, the processor of the controller 240 can compare the changes in rotational speed to a threshold change of rotational speed, and make determinations based on such comparison. If the processor determines that the spinner 208 needs to be cleaned, the controller 240 prompts the cleaning assembly 220 to activate. For example, the controller 240 can prompt activation of the heating element 232, and subsequently activate the controllable fluid valve 226 and fluid pump 224.

Figure 3:
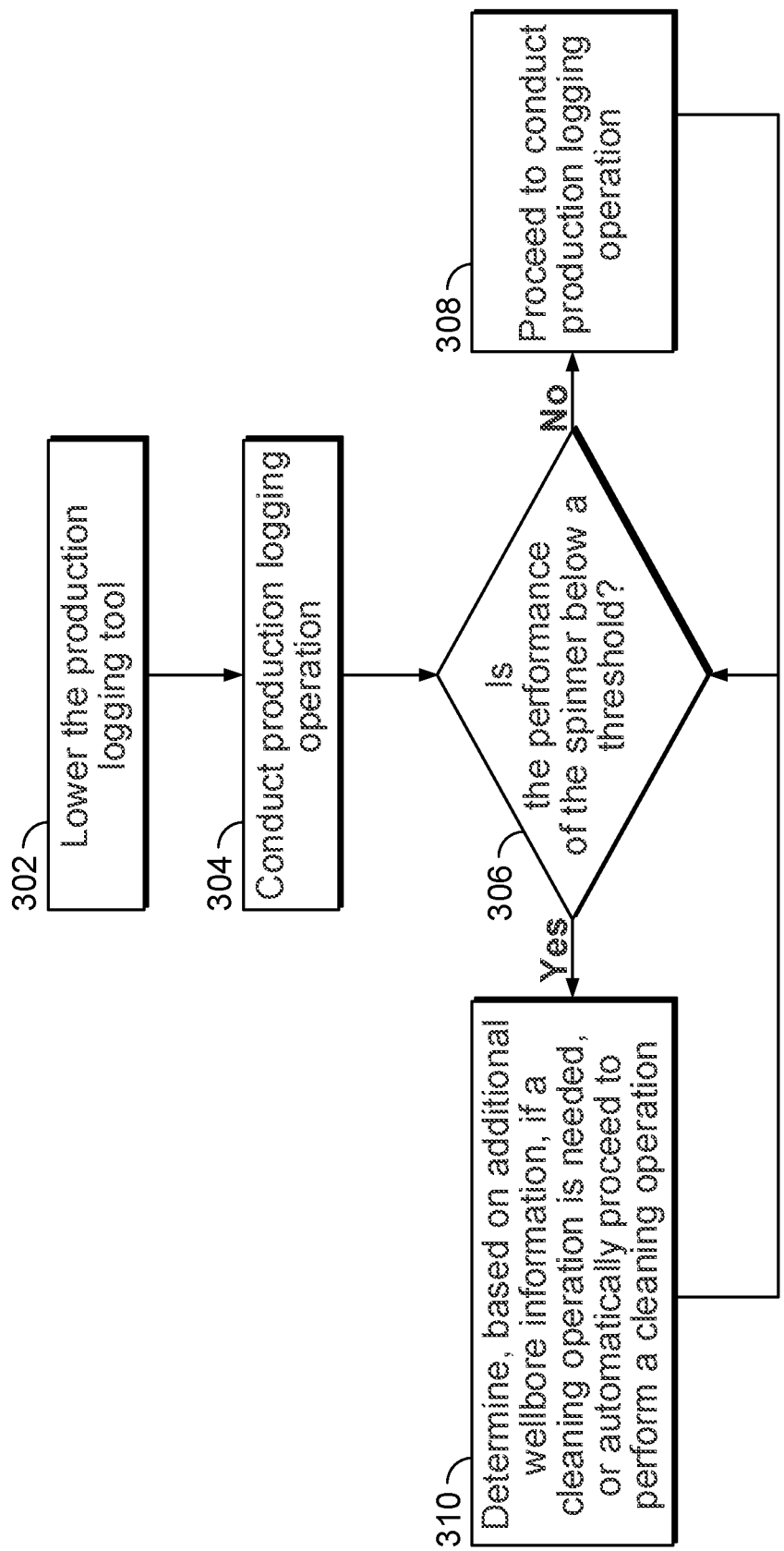
FIG. 3 is a decision flow diagram illustrating an example process for determining if a spinner should be cleaned.

FIG. 3 is a decision flow diagram illustrating an example process 300 for determining if a spinner, such as the spinner 208 of example production logging tool 200 of FIG. 2, should be cleaned. In the first block 302, the production logging tool is lowered within a wellbore. In the second block 304, a production logging operation is performed. In the third block 306, it is determined if the performance of the spinner is affected by a build-up of sticky materials on the spinner. This can be determined by determining if the rotational speed of the spinner is below a threshold or if the spinner is otherwise being prevented from rotating normally. In the fourth block 308, if the downhole measurement reading is normal, the production logging tool continues, such as until the production logging job is completed. The system can continue to determine if the performance of the spinner is below a threshold during each run. In block 310, if the downhole measurement reading indicates that the spinner is influenced by a build-up of sticky material, the system can help an operator make a decision of whether to activate a cleaning assembly, or the system can automatically turn on the cleaning assembly to conduct in situ self-cleaning of the spinner. Once the cleaning operation is performed, if the downhole measurement reading indicates that the performance of the spinner is restored, the system can continue with the logging operation. The cleaning operation can be selectively performed multiple times as needed.

Figure 4:
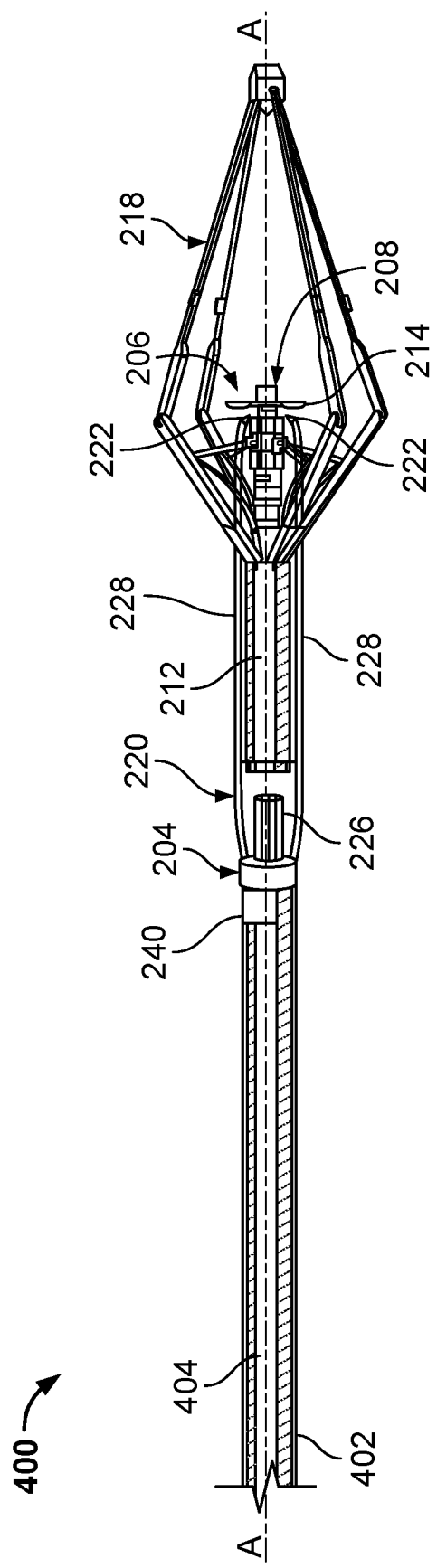
FIG. 4 is a schematic, partial cross-sectional front view, of a second example production logging tool.

FIG. 4 a schematic, partial cross-sectional front view of a second example production logging tool 400. The second example production logging tool 400 is the same as the example production logging tool 200 of FIG. 2, except that the second example production logging tool excludes fluid pump 224, fluid reservoir 230, and heating element 232. Instead, the second example production logging tool 400 connects to a remote fluid pump, remote fluid reservoir, and remote heating element via fluid tubing 404 residing in the well tubing 402. In some implementations, the well tubing 402 extends to a well head, and the fluid tubing 404 resides within the well tubing 402 and fluidly connects to a fluid reservoir, fluid pump, or both, at a remote location (such as at the well surface). The second example production logging tool 400 can also be used in the example well system 100 of FIG. 1, such as in the production logging tool 118 disposed in the wellbore 102 (or within a production tubing) of FIG. 1. The well tubing 402 of the second example production logging tool 400 is shown as a coiled tubing that carries the second example production logging tool 400, though the second example production logging tool 400 can be carried on a different type of flexible tubing or well string.

Figure 5:
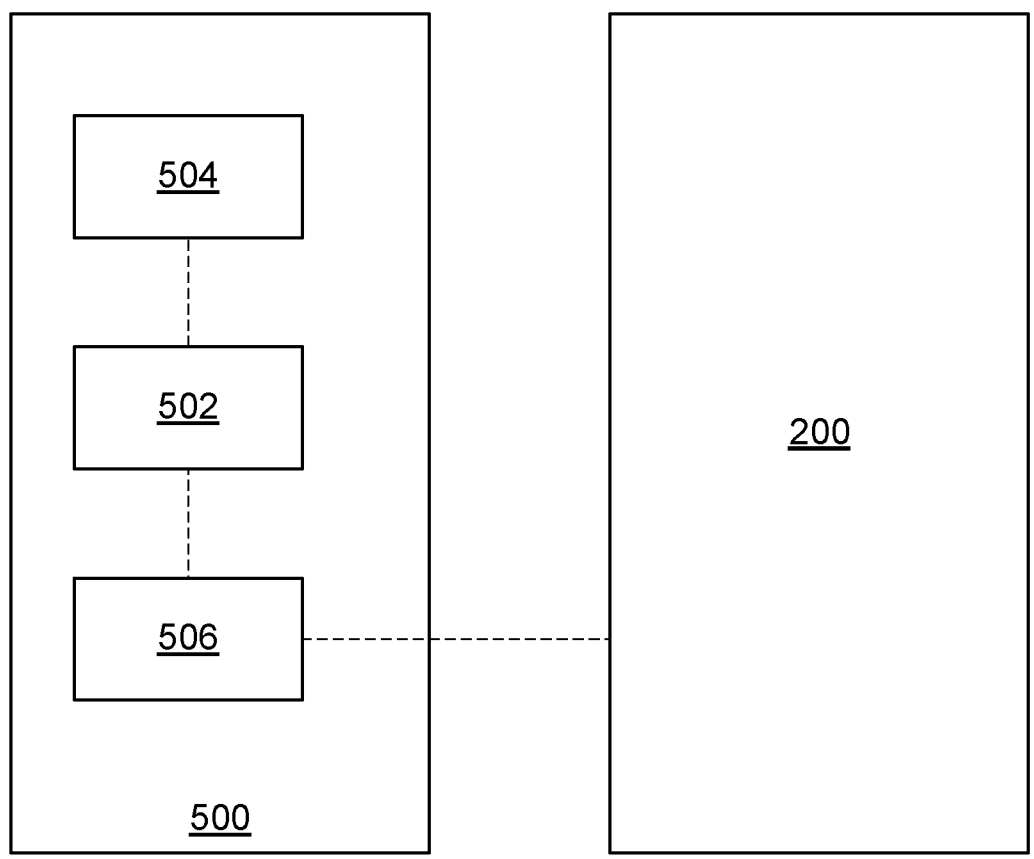
FIG. 5 is a block diagram of an example controller that can be used in the example production logging tools of FIG. 2 of FIG. 4.

FIG. 5 is a block diagram of a controller 500 that can be used with aspects of the controller 240 of the example production logging tool 200 of FIG. 2 or the second example production logging tool 400 of FIG. 4. The controller 500 can include one or more processors 502 and non-transitory memory 504 including instructions to facilitate sending and receiving signals through an input/output (I/O) interface 506. The controller 500 can communicate with components of the example production logging tool 200 such as, for example, the sensor block 216, spinner gauge 212, fluid pump 224, controllable fluid valve 226, heating element 232, a combination of these, or other components of the example production logging tool 200. In some implementations, the controller 500 is located entirely downhole within the production logging tool 200, entirely at a topside facility, or a combination of downhole and topside locations. For example, the controller 500 can be a distributed controller, where a portion of the controller 500 is located within or local to the production logging tool 200, while another portion of the controller 500 is located elsewhere at a surface of the well.

Figure 6:
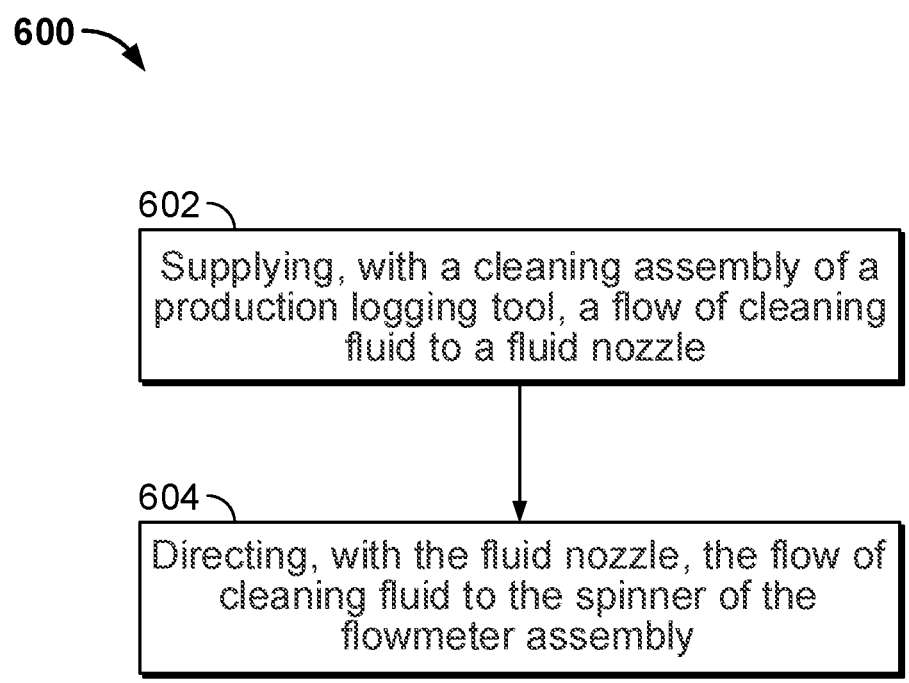
FIG. 6 is a flowchart describing an example method for cleaning a production logging tool.

FIG. 6 is a flowchart describing and example method 600, for example, performed by the example production logging tool 200 of FIG. 2. At 602, a cleaning assembly of a production logging tool supplies a flow of cleaning fluid to a fluid nozzle. The production logging tool includes a housing having a first end configured to connect to a well string disposed in a wellbore, a flowmeter assembly supported by the housing and including a spinner configured to be exposed to fluid in the wellbore and to rotate about a central rotational axis of the spinner, and the cleaning assembly connected to the housing and including the fluid nozzle. At 604, the fluid nozzle directs the flow of cleaning fluid to the spinner of the flowmeter assembly. In some implementations, supplying the flow of cleaning fluid to the fluid nozzle with the cleaning assembly includes driving the flow of cleaning fluid to the fluid nozzle with a fluid pump fluidly connected to the fluid nozzle. Driving the flow of cleaning fluid to the fluid nozzle with the fluid pump can include controlling the flow of cleaning fluid to the fluid nozzle with a solenoid valve between the fluid pump and the fluid nozzle. In certain implementations, the method includes storing the cleaning fluid in a fluid reservoir of the cleaning assembly, and heating, with a heating element connected to the fluid reservoir, the cleaning fluid in the fluid reservoir to a minimum threshold temperature.

A number of implementations have been described. Nevertheless, it will be understood that various modifications may be made without departing from the spirit and scope of the disclosure.

What is claimed is:

1. A production logging tool, comprising:
   a housing having a first end configured to connect to a well string disposed in a wellbore;
   a flowmeter assembly supported by the housing and comprising a spinner configured to be exposed to fluid in the wellbore and to rotate about a central rotational axis of the spinner; and
   a cleaning assembly connected to the housing and comprising a fluid nozzle directed at the spinner, the fluid nozzle configured to direct a flow of cleaning fluid at the spinner.

2. The production logging tool of claim 1, wherein the flowmeter assembly further comprises:
   a spinner shaft coupled to the spinner to rotate with the spinner, and
   a spinner gauge surrounding at least part of the spinner shaft, the spinner gauge configured to sense a rotational speed of the spinner.

3. The production logging tool of claim 1, wherein the cleaning assembly comprises a fluid pump fluidly connected to the fluid nozzle, the fluid pump configured to drive the flow of cleaning fluid to the fluid nozzle.

4. The production logging tool of claim 3, wherein the cleaning assembly further comprises a controllable fluid valve between the fluid pump and the fluid nozzle, the controllable fluid valve configured to control the flow of cleaning fluid to the fluid nozzle.

5. The production logging tool of claim 4, wherein the controllable fluid valve comprises a solenoid valve.

6. The production logging tool of claim 3, wherein the cleaning assembly comprises tubing fluidly connecting the fluid pump and the fluid nozzle.

7. The production logging tool of claim 3, further comprising a fluid reservoir within the housing, the fluid reservoir being fluidly connected to the fluid pump, the fluid reservoir configured to hold the cleaning fluid and supply the cleaning fluid to the fluid pump.

8. The production logging tool of claim 7, further comprising a heating element connected to the fluid reservoir, the heating element configured to raise a temperature of the cleaning fluid in the fluid reservoir to a minimum threshold temperature.

9. The production logging tool of claim 8, wherein the heating element comprises a heating cartridge disposed within the fluid reservoir.

10. The production logging tool of claim 1, further comprising a tubing fluidly connected to the fluid nozzle, the tubing configured to supply the cleaning fluid to the fluid nozzle from a fluid reservoir.

11. The production logging tool of claim 1, wherein the cleaning assembly comprises a plurality of fluid nozzles directed toward the spinner, the plurality of fluid nozzles comprising the fluid nozzle.

12. The production logging tool of claim 1, wherein the fluid nozzle is positioned laterally offset from the central rotational axis of the spinner.

13. The production logging tool of claim 12, wherein the spinner comprises a plurality of blades, and the fluid nozzle is directed toward at least one blade of the plurality of blades.

14. The production logging tool of claim 1, wherein the fluid nozzle comprises a one-way valve to permit the flow of cleaning fluid out of the nozzle and configured to restrict a flow of fluid into the nozzle from the wellbore.

15. The production logging tool of claim 1, further comprising a controller operatively coupled to the cleaning assembly to control operation of the cleaning assembly.

16. A method, comprising:
   supplying, with a cleaning assembly of a production logging tool, a flow of cleaning fluid to a fluid nozzle, the production logging tool comprising:
      a housing having a first end configured to connect to a well string disposed in a wellbore;
      a flowmeter assembly supported by the housing and comprising a spinner configured to be exposed to fluid in the wellbore and to rotate about a central rotational axis of the spinner; and
      the cleaning assembly connected to the housing and comprising the fluid nozzle; and
   directing, with the fluid nozzle, the flow of cleaning fluid to the spinner of the flowmeter assembly.

17. The method of claim 16, wherein supplying the flow of cleaning fluid to the fluid nozzle with the cleaning assembly comprises driving the flow of cleaning fluid to the fluid nozzle with a fluid pump fluidly connected to the fluid nozzle.

18. The method of claim 17, wherein driving the flow of cleaning fluid to the fluid nozzle with the fluid pump comprises controlling the flow of cleaning fluid to the fluid nozzle with a solenoid valve between the fluid pump and the fluid nozzle.

19. The method of claim 16, further comprising:
   storing the cleaning fluid in a fluid reservoir of the cleaning assembly; and
   heating, with a heating element connected to the fluid reservoir, the cleaning fluid in the fluid reservoir to a minimum threshold temperature.

20. A downhole wellbore tool, comprising:
   a housing having a first end configured to connect to a well string disposed in a wellbore;

a flowmeter assembly supported by the housing and comprising a spinner configured to be exposed to fluid in the wellbore and to rotate about a central rotational axis of the spinner;

a cleaning assembly connected to the housing and comprising a fluid nozzle directed at the spinner, the fluid nozzle configured to direct a flow of cleaning fluid at the spinner;

a controller operationally coupled to the cleaning assembly and configured to activate the cleaning assembly to direct the flow of cleaning fluid at the spinner;

a receiver communicatively coupled to the flowmeter assembly and configured to receive, from the flowmeter assembly, information comprising at least one parameter of the fluid in the wellbore; and a processor communicatively coupled to the receiver and configured to:
  receive the information from the receiver,
  compare the information to a fluid parameter threshold,
  determine, based on the comparison, that operation of the spinner is impaired, and
  transmit, based on the determination, instructions to the controller to activate the cleaning assembly.

21. The downhole wellbore tool of claim 20, wherein the cleaning assembly further comprises:

a fluid pump fluidly connected to the fluid nozzle, the fluid pump configured to drive the flow of cleaning fluid to the fluid nozzle;

a controllable fluid valve between the fluid pump and the fluid nozzle, the controllable fluid valve configured to control the flow of cleaning fluid to the fluid nozzle;

a fluid reservoir within the housing, the fluid reservoir being fluidly connected to the fluid pump, and the fluid reservoir configured to hold the cleaning fluid and supply the cleaning fluid to the fluid pump; and a heating element connected to the fluid reservoir, the heating element configured to raise a temperature of the cleaning fluid in the fluid reservoir to a minimum threshold temperature.

* * * * *